US012560808B2

(12) United States Patent

He et al.

(10) Patent No.: US 12,560,808 B2

(45) Date of Patent: Feb. 24, 2026

(54) WAVEGUIDE CALIBRATION

(71) Applicant: MLOptic Corp, Redmond, WA (US)

(72) Inventors: Jiang He, Redmond, WA (US); Wei Zhou, Sammamish, WA (US); Wei Wang, Redmond, WA (US)

(73) Assignee: MLOptic Corp., Redmond, WA (US)

( * ) Notice: Subject to any disclaimer, the term of this patent is extended or adjusted under 35 U.S.C. 154(b) by 441 days.

(21) Appl. No.: 18/217,476

(22) Filed: Jun. 30, 2023

(65) Prior Publication Data

US 2024/0231085 A1     Jul. 11, 2024

Related U.S. Application Data

(63) Continuation-in-part of application No. 18/093,941, filed on Jan. 6, 2023, now Pat. No. 11,709,325.

(51) Int. Cl.
| | |
|---|---|
| *G02B 6/38* | (2006.01) |
| *G02B 6/36* | (2006.01) |
| *G02B 6/42* | (2006.01) |
| *G02B 27/01* | (2006.01) |

(52) U.S. Cl.
CPC ....... *G02B 27/0101* (2013.01); *G02B 6/4221* (2013.01); *G02B 6/4227* (2013.01)

(58) Field of Classification Search
CPC ............... G02B 6/42; G02B 6/38; G02B 6/36
USPC ........................................................ 385/14
See application file for complete search history.

(56) References Cited

U.S. PATENT DOCUMENTS

| | | | | |
|---|---|---|---|---|
| 11,016,298 B2 * | 5/2021 | Schowengerdt | ..... | G02B 6/0028 |
| 11,022,747 B2 * | 6/2021 | Kangastupa | ......... | B23K 26/073 |
| 11,175,512 B2 * | 11/2021 | Waldern | .............. | G02B 26/105 |
| 11,351,633 B2 * | 6/2022 | Kangastupa | ....... | B23K 26/0613 |
| 2020/0306878 A1 * | 10/2020 | Kangastupa | ....... | B23K 26/0096 |
| 2020/0409156 A1 * | 12/2020 | Sissom | .................. | G02B 6/005 |

FOREIGN PATENT DOCUMENTS

| | | | | | |
|---|---|---|---|---|---|
| CN | 105784335 A | * | 7/2016 | ........ | G01M 11/0221 |
| CN | 107848069 A | * | 3/2018 | ......... | B23K 26/0604 |
| CN | 114349369 A | * | 3/2018 | | |
| CN | 207062146 U | * | 3/2018 | .......... | C03C 25/104 |
| CN | 114325956 A | * | 4/2022 | | |
| JP | 2007279226 A | * | 10/2007 | | |
| JP | 2020513325 A | * | 5/2020 | | |
| TW | 201805100 A | * | 2/2018 | ........ | B23K 26/0604 |
| TW | 1789466 B | * | 1/2023 | | |
| TW | 202308245 A | * | 2/2023 | | |
| WO | WO-2019129917 A1 | * | 7/2019 | ......... | B23K 26/0096 |

* cited by examiner

*Primary Examiner* — Kaveh C Kianni

(74) *Attorney, Agent, or Firm* — Jong Patent Firm; Cheng Ning Jong; Tracy P. Jong

(57)          ABSTRACT

A method for aligning the projection of a first light source with an in-coupler of a planar waveguide, the method including supplying a secondary light source through an optical path of the planar waveguide to exit at the in-coupler of the planar waveguide as an exit light, determining the concentricity of the exit light with respect to the first light source, and improving the concentricity of the exit light with respect to the first light source by adjusting the positioning of the first light source such that the exit light becomes concentric with the projection of the first light source.

17 Claims, 6 Drawing Sheets

WAVEGUIDE CALIBRATION

PRIORITY CLAIM AND RELATED APPLICATIONS

This continuation-in-part application claims the benefit of priority from non-provisional application U.S. Ser. No. 18/093,941 filed Jan. 6, 2023. Said application is incorporated by reference in its entirety.

BACKGROUND OF THE INVENTION

1. The Field of the Invention

The present invention relates to a waveguide calibration process. More specifically, the present invention is directed to a waveguide calibration process in which the alignment of a projector optically coupled to the waveguide is verified.

2. Background Art

A waveguide useful for augmented reality (AR) applications is typically clear and optically coupled to a projector at an in-coupler while an out-coupler of the waveguide is configured to receive images transmitted from the projector. The accurate alignment of the projector with respect to the in-coupler is important to ensure that proper images are provided at the out-coupler to an observer. In some instances, conventional projector alignment processes involve the use of sophisticated algorithms and methodologies to discern the position of a projection and hence a projector with respect to the gratings of an in-coupler of a waveguide as images used for indicating the gratings and the projection cannot be readily visually discerned due to the lack of contrast between the two items. In other instances, conventional projector alignment processes involve alternatingly control a projection of a projector and a secondary light source such that discrepancies in projector alignment can be inferred from combined images indicating the gratings and the projection. These processes are error-prone and in some cases, no definitive alignment discrepancies can be determined and in other cases, no proper alignment can be ascertained.

There exists a need for a waveguide calibration process that is simple to perform, requires fewer steps to perform and produces calibration results that are definitive once the calibration process is complete.

SUMMARY OF THE INVENTION

In accordance with the present invention, there is provided a method for determining the alignment of the projection of a first light source with an in-coupler of a planar waveguide, the method including:
  (a) supplying a secondary light source through an optical path of the planar waveguide to exit at the in-coupler of the planar waveguide as an exit light; and
  (b) determining the concentricity of the exit light with respect to the first light source.

In one embodiment, the determining step includes imaging the in-coupler of the planar waveguide for a cast image of the first light source and a cast image of the secondary light source, determining a first center location of the cast image of the first light source and a second center location of the cast image of the secondary light source and comparing the first center location and the second center location, whereby if the first center location differs from the second center location, the exit light is said to be non-concentric with respect to the first light source.

In accordance with the present invention, there is provided a method for aligning the projection of a first light source with an in-coupler of a planar waveguide, the method including:
  (a) supplying a secondary light source through an optical path of the planar waveguide to exit at the in-coupler of the planar waveguide as an exit light;
  (b) determining the concentricity of the exit light with respect to the first light source; and
  (c) improving the concentricity of the exit light with respect to the first light source by adjusting the positioning of the first light source such that the exit light becomes concentric with the projection of the first light source.

In one embodiment, the determining step and the improving step include imaging the in-coupler of the planar waveguide for a cast image of the first light source and a cast image of the secondary light source, determining a first center location of the cast image of the first light source and a second center location of the cast image of the secondary light source and comparing the first center location and the second center location, whereby if the first center location differs from the second center location, the positioning of the first light source is adjusted such that the first center location is substantially the same as the second center location.

In one embodiment, the planar waveguide can be a diffraction-type waveguide or a reflection-type waveguide. In one embodiment, the projection of the first light source is a projection having a cylindrical profile. In one embodiment, the exit light are light rays constituting a cylindrical profile. In one embodiment, the entry point into the planar waveguide of said secondary light source is an out-coupler of the planar waveguide. In one embodiment, the entry point into the planar waveguide of said secondary light source is a portion of the planar waveguide that is not an out-coupler of the planar waveguide. In one embodiment, the projection is a projection configured for augmented reality (AR) projection. In one embodiment, the method further includes minimizing the intensity of the projection of the first light source.

An object of the present invention is to provide a method for aligning the projection of a projector optically coupled to a planar waveguide.

Another object of the present invention is to provide a method for aligning the projection of a projector optically coupled to a planar waveguide that is uncomplicated.

Another object of the present invention is to provide a method for aligning the projection of an augmented reality (AR) projector optically coupled to a planar waveguide.

Another object of the present invention is to provide a method for aligning the projection of a projector optically coupled to a planar waveguide where a verifying feature can be used simultaneously with the projection to avoid potential errors associated with an alignment process.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—waveguide, e.g., planar waveguide
4—projector
6—in-coupler
8—out-coupler
10—imaging device
12—imaging device
14—observer's eye
16—view of projector as received by imaging device due to the effect of light from projector directed at in-coupler
18—view of gratings as received by imaging device due to the effect of light from secondary light source received at in-coupler through optical path of waveguide
20—light transmitted through waveguide
22—eye relief
24—interpupillary distance
26—view of gratings as received by imaging device due to the effect of light from projector directed at in-coupler
28—corrective action
30—determined central axis of projection
32—determined central axis of gratings
34—light source directed at in-coupler
36—secondary light source
38—optical path
40—image of gratings of in-coupler

Particular Advantages of the Invention

The present projector alignment process of a waveguide optically coupled to a projector allows the alignment status of the projector to be viewed in real time and a corrective action to be taken while the alignment status continues to be accessible in real time. The present projector alignment process can be completed accurately as the alignment status of the projector can be displayed clearly, i.e., a discrepancy and the magnitude of the discrepancy in the projector alignment can be clearly displayed. When a projector alignment is being corrected, the completion of the correction process is clearly delineated when a projection of the projector has been made coaxially disposed with the gratings at an in-coupler of a waveguide optically coupled to the projector.

Detailed Description of a Preferred Embodiment

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

As used herein, the term "virtual reality" (VR) is used to mean the technology related to the use of a display including one or more optical components that introduce optical distortions or aberrations into the image data, therefore encompassing other related fields of technology, e.g., "augmented reality" (AR) and "mixed reality" (MR), etc.

As used herein, the term "waveguide" is used to mean a waveguide known generally as a planar waveguide or a slab waveguide. A planar waveguide is a type of optical waveguide that consists of a thin, planar (flat) structure for guiding and confining light within a specific region. In a planar waveguide, the guiding structure is typically formed by depositing or etching thin layers of different materials on a substrate.

Figure 1:
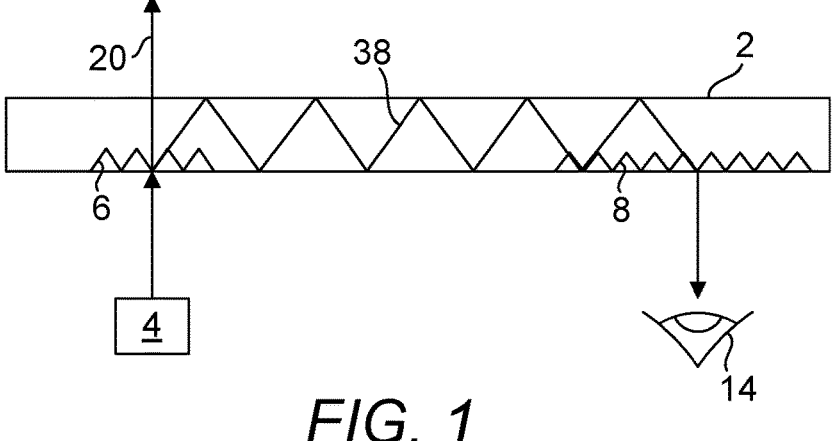
FIG. 1 is a diagram depicting the result of directing a projection at an in-coupler of a waveguide for an observer's eye.
Figure 2:
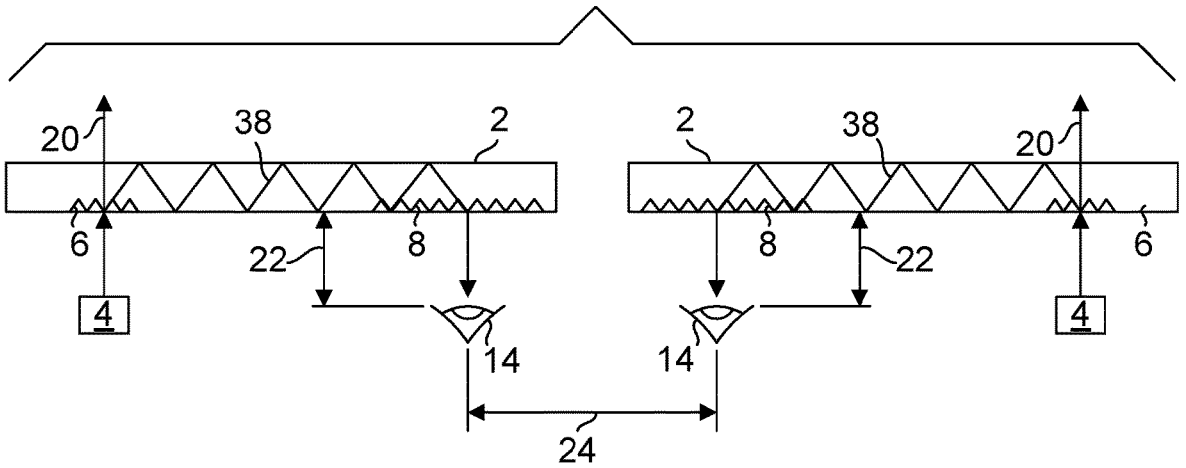
FIG. 2 is a diagram depicting the result of directing a projection at an in-coupler of each waveguide for an observer's eyes.

FIG. 1 is a diagram depicting the result of directing a projection of a projector 4, e.g., a microLED (mLED) projector or an organic light-emitting diode (OLED) projector, etc., at an in-coupler 6 of a waveguide 2 for an observer's eye 14. FIG. 2 is a diagram depicting the result of directing a projection at an in-coupler of each waveguide for an observer's eyes 14. Note that each waveguide 2 is disposed with its out-coupler 8 disposed at an eye relief 22 from an observer's eye 14 and the two waveguides 2 are disposed at a distance suitable for the interpupillary distance 24 of the observer. In one application, e.g., in a VR application, an observer's eye 14 receives visual information via a waveguide 2 with a projection from a projector 4 received at the in-coupler 6 of the waveguide 2 and transmitted to the out-coupler 8 of the waveguide 2 to be received at the observer's eye 14. In one embodiment, the projection is a projection configured for augmented reality (AR) projection. Waveguide gratings are used in an in-coupler 6 and an out-coupler 8 of a waveguide 2. In order for a waveguide 2 to transmit visual data to an observer's eye 14 effectively, a projector 4 coupled the waveguide 2 must be aligned properly with the waveguide 2, particularly the in-coupler 6 of the waveguide 2. The gratings at the in-coupler 6 must be aligned concentrically with the projector 4.

Figure 3:
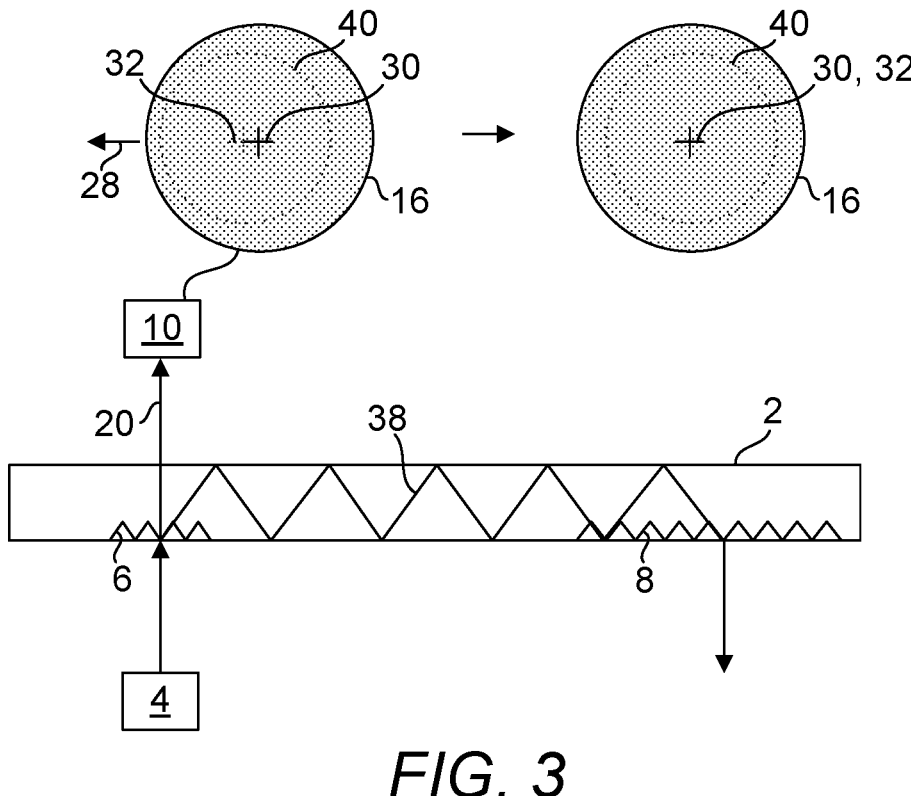
FIG. 3 is a diagram depicting a prior art method in aligning a projection at an in-coupler of a waveguide.

FIG. 3 is a diagram depicting a prior art method in aligning a projection at an in-coupler 6 of a waveguide 2. Here, an imaging device 10 is disposed in line with the projection axis of a projector 4. The image 16 received at the imaging device 10 is essentially the result of light transmission from a projector 4 through the in-coupler 6 of the waveguide 2 that is considered the waste light 20. Little distinction can be made between the portion of image that is a result of a projection of projector and the gratings as most light rays are transmitted by the in-coupler 6 to be received at imaging device 10 and only a relatively small proportion of the light rays are directed via an optical path leading from the in-coupler 6 of the waveguide 2 to the out-coupler 8 of the waveguide 2. It shall be noted that the contrast between the light rays through gratings and the light rays around the gratings are simply insufficient for a definitive delineation of the gratings with respect to the projection. Therefore, sophisticated image processing algorithms may be required to successfully and accurately delineate the area taken up by the gratings versus the area taken up by the projection. The central axis 30 of the projection may be determined by locating the center of the projection. Likewise, the central axis 32 of the gratings may be determined by locating the center of the area delineated as gratings. Upon determining that an adjustment is required to improve alignment of a projector with respect to in-coupler gratings, i.e., the central axis of the projection of the projector is not coaxially disposed with the central axis of the gratings, then an improvement of such an alignment or an adjustment of the central axis of the projection must be carried out by moving 28 the projector until it becomes coaxially disposed with the central axis of the gratings. Upon completing such an adjustment, an image of light transmission through the in-coupler 6 of the waveguide 2 is again obtained and analyzed. Again, sophisticated image processing algorithms may be required to determine whether a suitable alignment has been successfully achieved. This process may be repeated one or more times until a satisfactory alignment has been achieved. Therefore, the throughput for aligning waveguides in this manner is low and in some cases, the alignment result may not even be sufficiently satisfactory for stringent alignment requirements.

Figure 4:
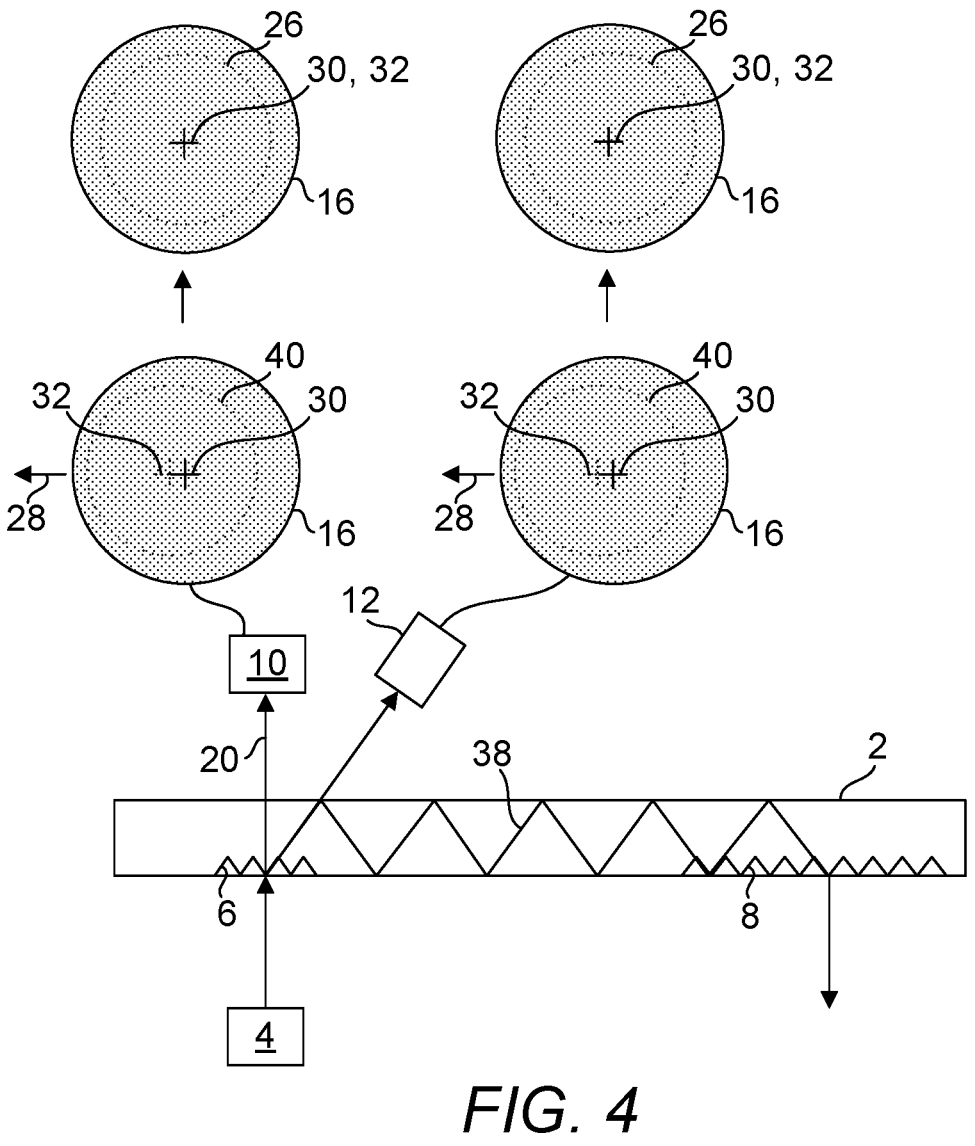
FIG. 4 is a diagram depicting a prior art method in aligning a projection at an in-coupler of a waveguide.

FIG. 4 is a diagram depicting a prior art method in aligning a projection at an in-coupler of a waveguide. Again, an imaging device 10 is disposed in line with the projection axis of a projector 4. The image 16 received at the imaging device 10 is essentially the result of light transmission from a projector 4 through the in-coupler 6 of the waveguide 2 that is considered the waste light 20. In this example, in addition to imaging device 10, a second imaging device 12 is disposed in a position where a weak transmission of light rays may be detected by the second imaging device 12 to potentially obtain images with sufficient delineation of the gratings with respect to the projection. In this case, although an additional imaging device 12 is used to provide additional imaging data to be processed for concentricity of the gratings with respect to the projection, there is still potentially insufficient contrast between the light rays through gratings and the light rays around the gratings for a definitive delineation of the gratings with respect to the projection. As there are two imaging devices 10, 12 used, the throughput for aligning waveguides in this manner can drop further compared to the case shown in FIG. 3 as even more imaging and adjustment cycles may be involved compared to the process shown in FIG. 3.

Figure 5:
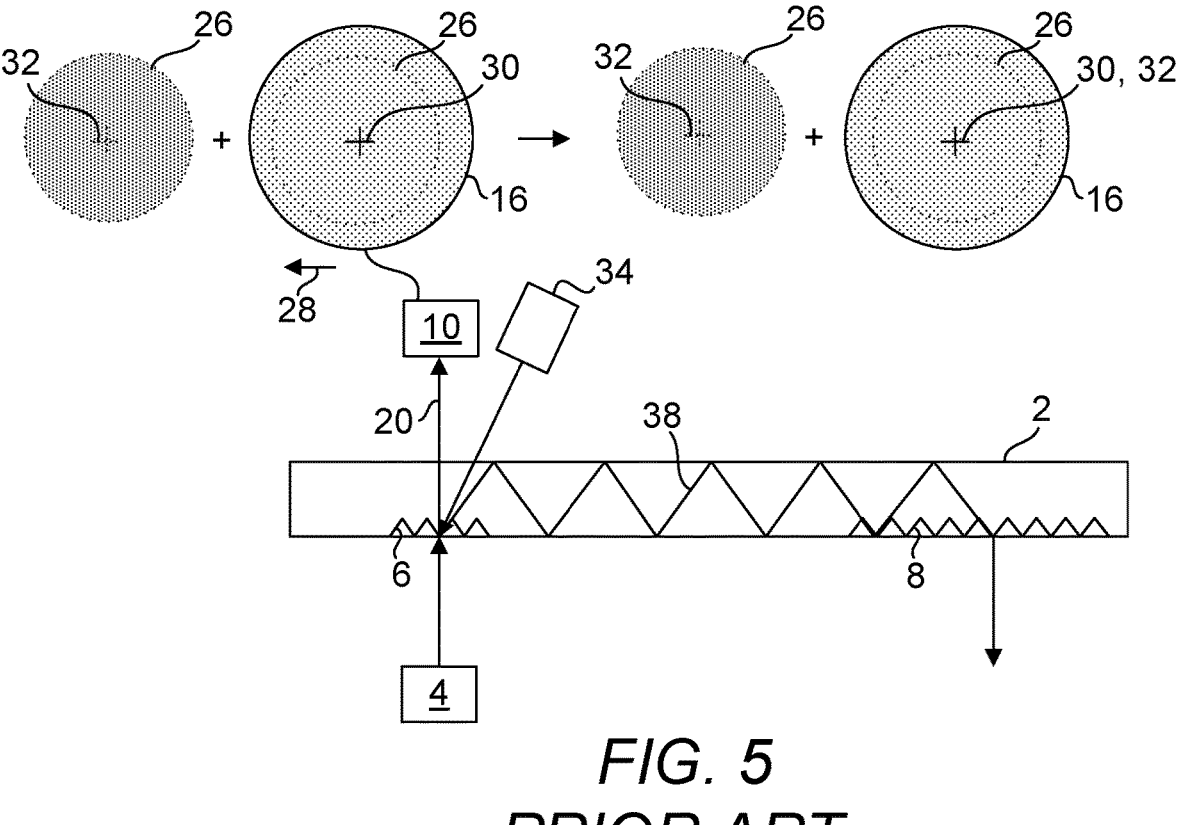
FIG. 5 is a diagram depicting a prior art method in aligning a projection at an in-coupler of a waveguide.

FIG. 5 is a diagram depicting a prior art method in aligning a projection at an in-coupler of a waveguide. Again, an imaging device 10 is disposed in line with the projection axis of a projector 4. The image received at the imaging device 10 is essentially the result of light transmission through the in-coupler 6 of the waveguide 2 that is considered the waste light 20. In this example, in addition to imaging device 10, a light source 34 is configured to be directed at the in-coupler 6 of the waveguide 2. An image of the projection of the projector is obtained with the light source 34 turned off. The projection of the projector is then turned off and the light source 34 is instead turned on. An image 26 of the gratings is now obtained as illuminated by light source 34. The image 26 of the gratings is clearly defined as the projector is turned off. It shall be noted that, with the projector 4 turned on, the gratings would not have been clearly defined as shown in FIG. 5. Although the gratings of the in-coupler 6 are clearly defined in one image 26, this image does not occur simultaneously with the image of the projection. Therefore, in order to determine the relative positioning of the light rays through the gratings and the light rays around the gratings, image 26 and the image of the projection that are available in two different frames must be overlaid. As they do not occur in a single frame, errors can be introduced when the two frames are combined. Upon determining that an adjustment is required (from the combined frames) to improve alignment of a projector with respect to in-coupler gratings, i.e., the central axis of the projection of the projector is not coaxially disposed with the central axis of the gratings, then an improvement of such an alignment or an adjustment of the central axis of the projection must be carried out by moving 28 the projector until it becomes coaxially disposed with the central axis of the gratings. Upon completing such an adjustment, an image of light transmission through the in-coupler 6 of the waveguide 2 and an image 26 are again obtained and analyzed. This process may be repeated one or more times until a satisfactory alignment has been achieved. Therefore, the throughput for aligning waveguides in this manner is also low and in some cases, the alignment results can be error-prone and insufficiently satisfactory for stringent alignment requirements. As there are more than one frame used in imaging, a projector alignment adjustment process involves multiple steps in controlling the projection of the projector 4 and the use of the light source 34, making the alignment process error-prone as there may be inadvertent positional changes of the projector 4 relative to the waveguide 2 during the execution of the alignment adjustment process.

Figure 6:
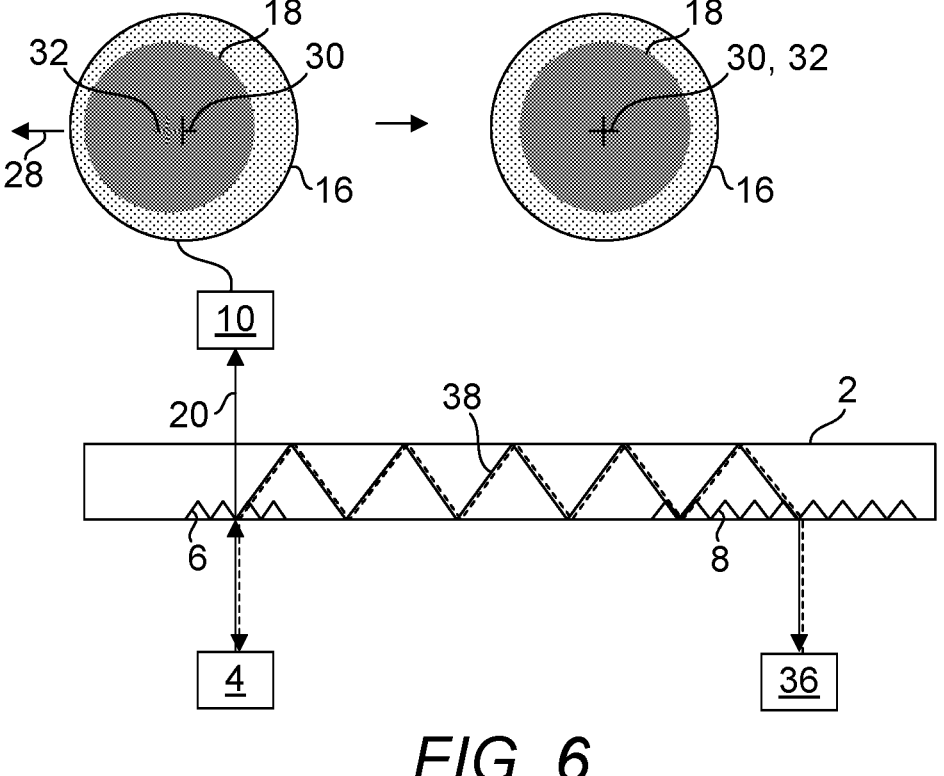
FIG. 6 is a diagram depicting one embodiment of a planar waveguide projector alignment process.

FIG. 6 is a diagram depicting one embodiment of a planar waveguide projector alignment process. It shall be noted that a secondary light source 36 is configured to be directed at the out-coupler 8 of waveguide 2 to cause a transmission of this light source through the optical path 38 of the waveguide 2 which results in an illumination of the gratings at the in-coupler 6. The output of the projector 4 is preferably minimized while this light source 36 is maximized. Aligning the light source 36 with the out-coupler 8 removes the need for painstakingly focusing a light source at the in-coupler 6 as in the case shown in FIG. 5 as the light source aimed at the out-coupler 8 causes light rays to be transmitted via the optical path 38 of the waveguide 2 to the in-coupler 6, illuminating the gratings of the in-coupler and optically delineating the gratings at the in-coupler from other portions of the waveguide 2 as seen through the imaging device 10 as a highly contrasting view 18 of the gratings and the light rays surrounding the gratings. The act of aligning the light source 34 shown in FIG. 5 to illuminate the gratings of the in-coupler, however, requires a trial-and-error process to ensure that only the gratings at the in-coupler are illuminated. It shall be noted in FIG. 6 that the image obtained at imaging device 10 shows a combined image of the illuminated gratings due to light source 36 and the projection due to the projector 4 in real time. Upon determining that the alignment of the projection needs to be corrected, i.e., the concentricity of the light exiting the in-coupler 6 due to light source 36, with respect to the projection of the projector 4, can be further improved, the lateral positioning of projector 4 is adjusted, e.g., by shifting 28 the projector 4 such that the central axis of the projection becomes substantially coaxially disposed with the central axis of the light exiting the in-coupler 6. In determining whether an alignment correction is required, a cast image of projection at the in-coupler 6 of the waveguide 2 and a cast image of the light source 36 directed at the out-coupler are obtained. A first center location of the cast image of the projection and a second center location of the cast image of light source 36 are obtained. The first center location and the second center location are then compared. If the first center location differs from the second center location, this means the exit light at the in-coupler 6 as a result of light source 36, is said to be non-concentric to the projection and an adjustment of the projector 4 position may be required. In order to make the contrast between the gratings and the projection even clearer, the intensity of the projection of the projector 4 is reduced while the intensity of the secondary light source 36 is increased.

Figure 7:
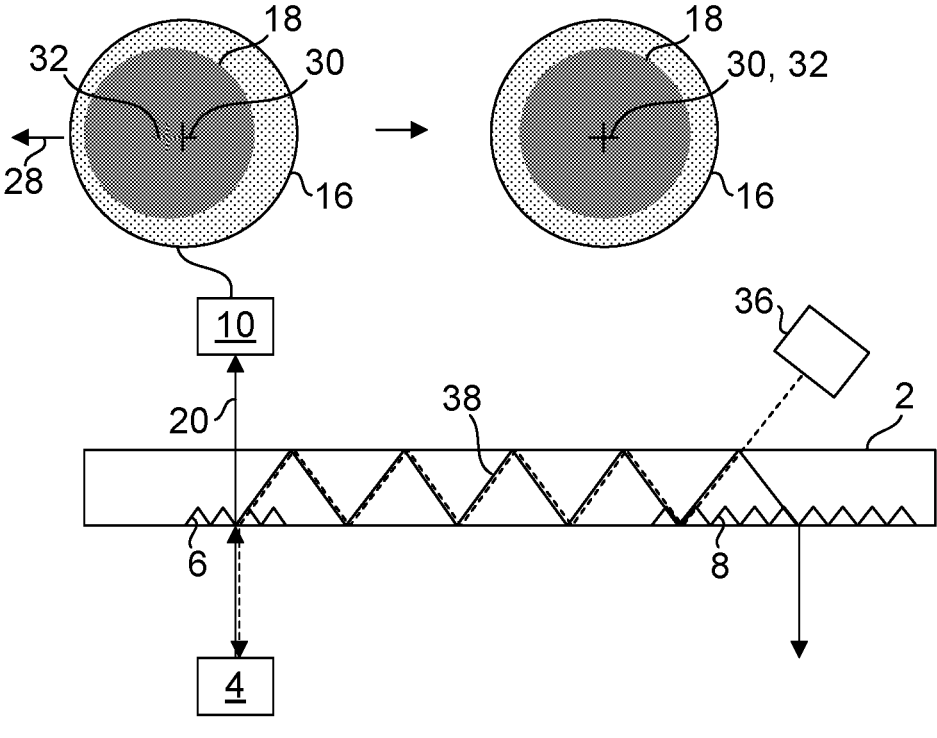
FIG. 7 is a diagram depicting one embodiment of a planar waveguide projector alignment process.

The projector of all types of waveguides, e.g., diffractive and reflective waveguides can be adjusted according to the method shown in FIGS. 6 and 7 as long as the waveguides is each configured to couple light into an in-coupler and couple light out of the waveguide into observer's eye via an out-coupler. FIG. 6 depicts an entry point of the secondary light source 36 that is an out-coupler 8 of the planar waveguide 2. FIG. 7 is a diagram depicting one embodiment of a planar waveguide projector alignment process where the entry point of the secondary light source 36 is not an out-coupler of the waveguide. Such a location is possible for use in projector alignment as long as an optical path of the waveguide is optically accessible from a location outside of the in-coupler and the out-coupler.

Although it may be possible to align a projector that provides light rays constituting a cross-sectional profile that is non-cylindrical, a projection having a cylindrical profile facilitates the identification of a central axis of the projection. Likewise, if the exit light is a plurality of light rays constituting a cylindrical profile, the central axis of the light rays can be identified without undue effort. Similar results of the illumination of gratings can be obtained by aligning a secondary light source with an optical path of the waveguide such that light rays are transmitted via the optical path to illuminate the gratings at the in-coupler. Referring back to FIG. 7, the entry point into the waveguide of the secondary light source is not an out-coupler 8 of the waveguide but rather a location which allows the secondary light source to be directed coaxially with an optical path such that light rays can be transmitted to illuminate the gratings at the in-coupler 6 of the waveguide.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for determining the alignment of the projection of a first light source with an in-coupler of a planar waveguide, said method comprising:
   (a) supplying a secondary light source through an optical path of the planar waveguide to exit at the in-coupler of the planar waveguide as an exit light; and
   (b) determining the concentricity of the exit light with respect to the first light source, wherein said determining step comprises imaging the in-coupler of the planar waveguide for a cast image of the first light source and a cast image of said secondary light source, determining a first center location of said cast image of the first light source and a second center location of the cast image of said secondary light source and comparing said first center location and said second center location, whereby if said first center location differs from said second center location, said exit light is said to be non-concentric with respect to the first light source.

2. The method of claim 1, wherein the planar waveguide is a waveguide of a type selected from the group consisting of a diffraction-type waveguide and a reflection-type waveguide.

3. The method of claim 1, wherein the projection of the first light source is a projection having a cylindrical profile.

4. The method of claim 1, wherein the exit light are light rays constituting a cylindrical profile.

5. The method of claim 1, wherein the entry point into the planar waveguide of said secondary light source is an out-coupler of the planar waveguide.

6. The method of claim 1, wherein the entry point into the planar waveguide of said secondary light source is a portion of the planar waveguide that is not an out-coupler of the planar waveguide.

7. The method of claim 1, wherein the projection is a projection configured for augmented reality (AR) projection.

8. The method of claim 1, further comprising minimizing the intensity of the projection of the first light source.

9. A method for aligning the projection of a first light source with an in-coupler of a planar waveguide, said method comprising:
   (a) supplying a secondary light source through an optical path of the planar waveguide to exit at the in-coupler of the planar waveguide as an exit light;
   (b) determining the concentricity of the exit light with respect to the first light source; and
   (c) improving the concentricity of the exit light with respect to the first light source by
      adjusting the positioning of the first light source such that the exit light becomes concentric with the projection of the first light source, wherein said determining step and said improving step comprise imaging the in-coupler of the planar waveguide for a cast image of the first light source and a cast image of said secondary light source, determining a first center location of said cast image of the first light source and a second center location of the cast image of said secondary light source and comparing said first center location and said second center location, whereby if said first center location differs from said second center location, the positioning of the first light source is adjusted such that said first center location is substantially the same as said second center location.

10. The method of claim 9, wherein the planar waveguide is a waveguide of a type selected from the group consisting of a diffraction-type waveguide and a reflection-type waveguide.

11. The method of claim 9, wherein the projection of the first light source is a projection having a cylindrical profile.

12. The method of claim 9, wherein the exit light are light rays constituting a cylindrical profile.

13. The method of claim 9, wherein the entry point into the planar waveguide of said secondary light source is an out-coupler of the planar waveguide.

14. The method of claim 9, wherein the entry point into the planar waveguide of said secondary light source is a portion of the planar waveguide that is not an out-coupler of the planar waveguide.

15. The method of claim 9, wherein the projection is a projection configured for augmented reality (AR) projection.

16. The method of claim 9, further comprising minimizing the intensity of the projection of the first light source.

17. A method for aligning the projection of a first light source with an in-coupler of a planar waveguide, said method comprising:

(a) supplying a secondary light source through an optical path of the planar waveguide to exit at the in-coupler of the planar waveguide as an exit light, wherein the entry point into the planar waveguide of said secondary light source is an out-coupler of the planar waveguide;

(b) determining the concentricity of the exit light with respect to the first light source; and (c) improving the concentricity of the exit light with respect to the first light source by adjusting the positioning of the first light source such that the exit light becomes concentric with the projection of the first light source, wherein said determining step and said improving step comprise imaging the in-coupler of the planar waveguide for a cast image of the first light source and a cast image of said secondary light source, determining a first center location of said cast image of the first light source and a second center location of the cast image of said secondary light source and comparing said first center location and said second center location, whereby if said first center location differs from said second center location, the positioning of the first light source is adjusted such that said first center location is substantially the same as said second center location.

* * * * *